United States Patent [19]

Ishikawa

[11] Patent Number: 5,027,686

[45] Date of Patent: Jul. 2, 1991

[54] ELECTRONIC METRONOME EQUIPPED WITH SUBTRACTION TIMER

[75] Inventor: Takehiro Ishikawa, Tokyo, Japan

[73] Assignee: Seiko Instruments Inc., Japan

[21] Appl. No.: 423,240

[22] Filed: Oct. 18, 1989

[30] Foreign Application Priority Data

Oct. 25, 1988 [JP] Japan ............................... 63-138710

[51] Int. Cl.⁵ ............................................ G09B 15/00

[52] U.S. Cl. ................................ 84/484; 84/DIG. 12

[58] Field of Search ................. 84/612, 636, 652, 668, 84/714, 484, DIG. 12

[56] References Cited

U.S. PATENT DOCUMENTS 4,014,167 3/1977 Hasegawa et al. .................. 84/484

4,218,874 8/1980 Ishida et al. .......................... 84/484

4,442,752 4/1984 Tsuchiya .............................. 84/484

*Primary Examiner*—L. T. Hix

*Assistant Examiner*—Khanh Dang

*Attorney, Agent, or Firm*—Bruce L. Adams; Van C. Wilks

[57] ABSTRACT

An electronic metronome comprises circuitry for setting a desired tempo, a circuit for generating a tempo signal corresponding in time to the desired tempo, circuitry for setting a desired time period and a circuit for generating a time-up signal corresponding in time to the end of the desired time period. A sound generator receives the tempo signal and the time-up signal for generating a tempo sound for each tempo signal and a time-up sound for the time-up signal. A control circuit terminates the generation of the tempo sounds after the generation of the time-up sound.

7 Claims, 3 Drawing Sheets

ELECTRONIC METRONOME EQUIPPED WITH SUBTRACTION TIMER

BACKGROUND OF THE INVENTION

Field of Industrial Utilization

This device relates to a multi-functional electronic metronome comprising the combination of an electronic metronome with a subtraction timer.

SUMMARY OF THE INVENTION

The present device combines a heretofore known electronic timer with a subtraction timer so as to generate a tempo sound for only an arbitrary timer time or can let the subtraction timer operate independently of the original metronome and can arbitrarily select the metronome function interlocked with, or independently of, the timer

Prior Art Technique

FIG. 4 is a block diagram showing the basic embodiment of U.S. Patent No. 4,014,167 proposed already by the Applicant of the present device. A tempo signal corresponding to the tempo selected by a tempo selection switch 3 is generated by a variable frequency division circuit 2 on the basis of a basic clock from an oscillator 1 and a rythm sound and a reference sound for tuning are outputted from a speaker 6 through an amplifier 5. However, it does not have functions of time such as a timer and a timepiece, still less the function of generating a tempo sound for only a predetermined period of time.

When one wants to practice on the piano for only 15 minutes by use of a conventional metronome, for example, he must practice while considering the time elapsed by a timepiece or the like. Though the metronome is indispensable for examining the tempo of musical pieces played in a concert hall or the like, there develop the problems in that the time of each piece or the remaining time of the piece during the performance cannot be known because the metronome has no timer.

Means for Solving the Problems

In order to solve the problems described above, the present device accomplishes a metronome operating in an interlocking arrangement with a timer and permitting the timer to operate independently.

A counter circuit which is set to an arbitrary value by timer setting means simultaneously with the metronome function makes subtraction by a 1 Hz signal and a zero detection circuit detects the passage of the set time.

Furthermore, a control circuit for controlling the counter circuit and a sound generation device drives the sound generation device or notifies time-up through display by use of a display device.

When the timer is operated independently, the present device has the function such that the zero detection circuit drives only once the sound generation device when the set time has lapsed so as to notify only time-up.

DETAILED DESCRIPTION OF THE INVENTION

Figure 1:
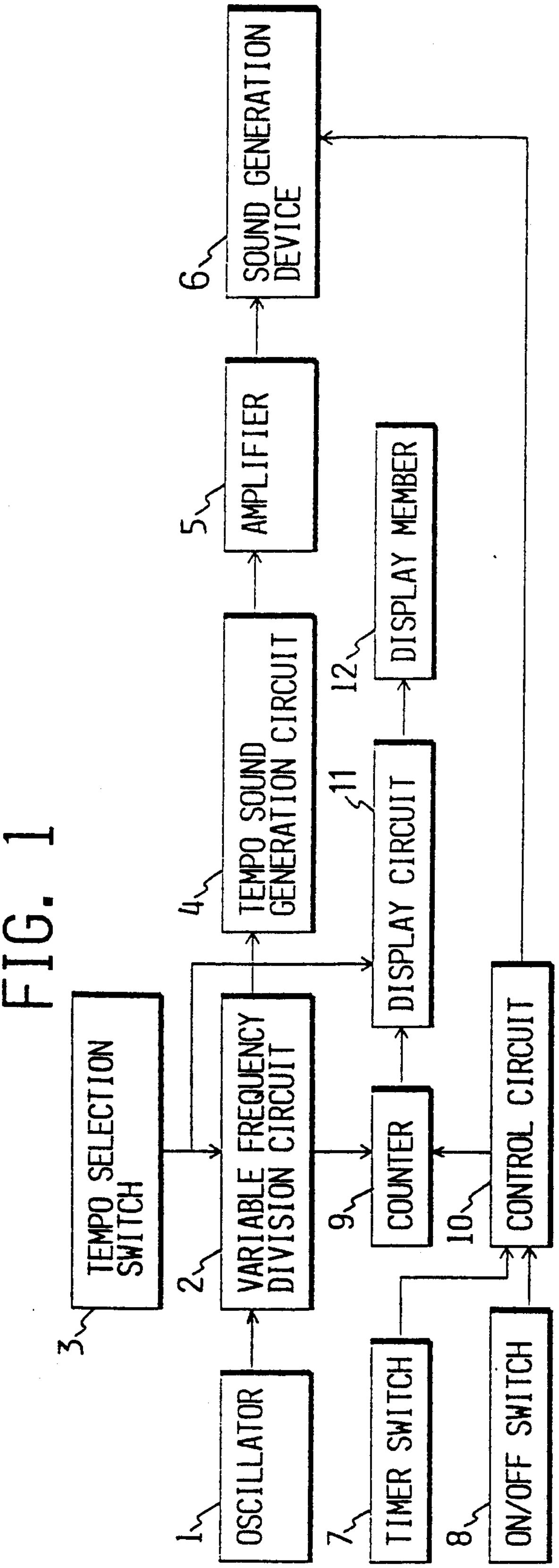
FIG. 1 is an overall block diagram of the present device.
Figure 2:
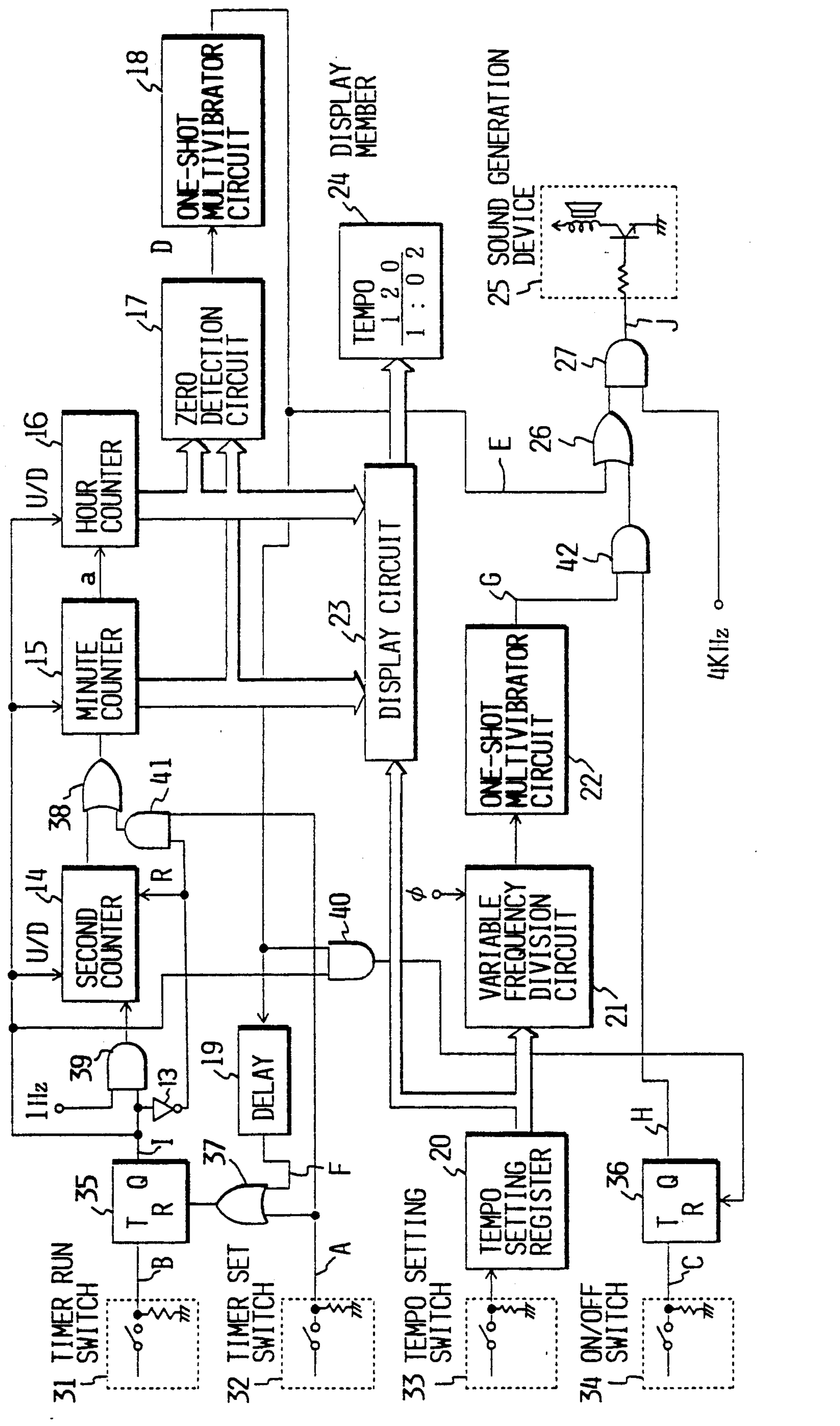
FIG. 2 is a circuit diagram of the present device.
Figure 3:
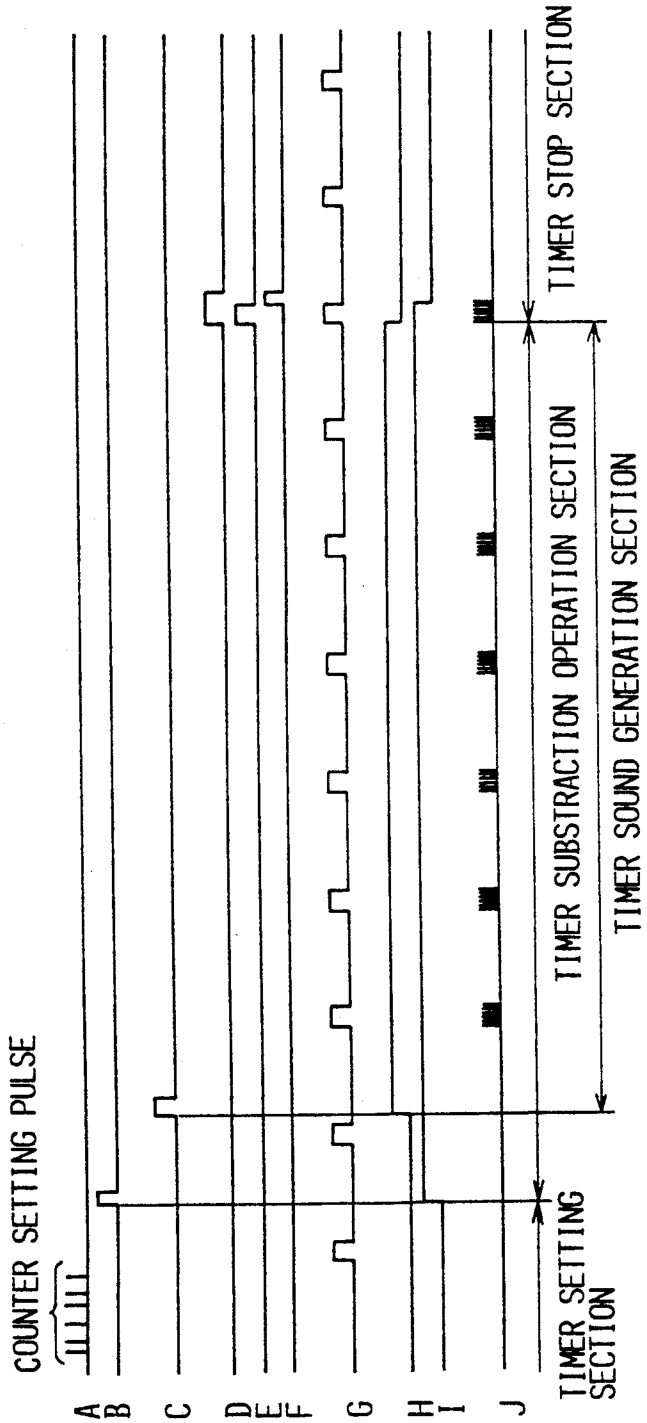
FIG. 3 is a timing chart of the present device.
Figure 4:
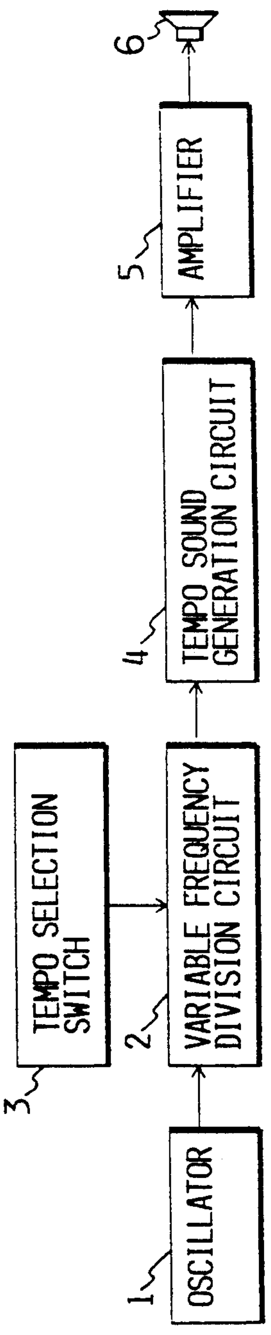
FIG. 4 (PRIOR ART)
FIG. 4 is a block diagram of a prior art example.

Hereinafter, the present device will be described in detail with reference to the drawings. FIG. 1 is an overall block diagram of the present device, FIG. 2 is a circuit diagram of the present device and FIG. 3 is a timing chart of the present device.

In the overall block diagram shown in FIG. 1, the explanation of the construction and action of an oscillator 1, a variable frequency division circuit 2, a tempo selection switch 3, a tempo sound generation circuit 4, an amplifier 5 and a sound generation device 6 will be omitted because they are the same as those of the prior art technique.

A control circuit 10 controls setting, start and reset of a counter 9 and the ON/OFF operation of the sound generation device 6 on the basis of the input signal which is inputted through a timer switch 7 and an ON/OFF switch 8. A display circuit 11 generates a signal for driving a display member on the basis of the tempo selection switch 3 and of the value of the counter 9.

Next, the present device will be described in detail with reference to FIGS. 2 and 3.

In FIG. 2, reference numeral 31 is a timer RUN switch; 32 is a timer SET switch; 33 is a tempo setting switch; 34 is an ON/OFF switch; 35 and 36 are T-type flip-flops (hereinafter referred to, as "T-F/F"); 3, 3 and 26 are OR circuits; 39, 41, 41, 42 and 27 are AND circuits; 13 is an inverter; 14 is a second counter; 15 is a minute counter; 16 is an hour counter; 17 is a zero detection circuit; 18 and 22 are one-shot multivibrator circuits, 19 is a delay circuit; 20 is a tempo setting register; 21 is a variable frequency division circuit; 23 is a display circuit; 24 is a display member; and 25 is a sound generation device.

The timer RUN switch 31 is connected to the input terminal T of T-F/F 35, the timer set switch 32 is connected to one of the input terminals of the OR circuit 37 and to one of the input terminals of the AND circuit 41, the tempo setting switch 33 is connected to the tempo setting register 20 and the ON/OFF switch 34 is connected to the input terminal T of T-F/F 36, respectively. The Q output of T-F/F 35 is connected to one of the input terminals of each AND circuit 39, 40, to the input terminal of inverter 13 and to the up-down control inputs (U/D) of the second, minute and hour counters 14, 15 and 16, respectively. The output of the AND circuit 39 connected to the input terminal of the second counter 14, the output of the second counter 14 is connected to one of the input terminals of the OR circuit 38, the output of the OR circuit 38 is connected to the input terminal of the minute counter 15 and the output of the minute counter 15 is connected to the input terminal of the hour counter 16, respectively. A 1 Hz-signal is inputted to the other input terminal of the AND circuit 39 from the variable frequency division circuit 21 and the output of the inverter 13 is applied to the reset input R of the second counter 14 and to the other input terminal of the AND circuit 41. The output of the AND circuit 41 is applied to the other input terminal of the OR circuit 38 and the output of the OR circuit 37 is connected to the reset input terminal R of T-F/F 35, respectively. The count outputs of the minute and hour counters 15, 16 are connected to the input terminals of the zero detection circuit 17 and display circuit 23, respectively, and the output of the zero detection circuit 17 is connected to the input terminal of the one-shot multivibrator circuit 18, whose output is in turn connected to one of the input terminals of the OR circuit 26, to the other input terminal of the AND circuit 40 and to the input terminal of the delay circuit 19. The output of the delay circuit 19 is connected to the other input terminal of the OR circuit 37.

The output of the tempo setting register 20 is connected to the input terminal of the display circuit 23 and to the input terminal of the variable frequency division circuit 21 and the output of the variable frequency division circuit 21 is connectected to the input terminal of the one-shot multivibrator circuit 22, whose output is connected to one of the input terminals of the AND circuit 42. The output of this AND circuit 42 is connected to the other input terminal of the OR circuit 26 and the output of the OR circuit 26 is connected to one of the input terminals of the AND circuit 27, whose output is connected to the input terminal of the sound generation device 25. The Q output of T-F/F 36 is connected to the other input terminal of the AND circuit 42 and the output of the AND circuit 40 is connected to the reset input terminal R of T-F/F 36.

A $\phi$ signal which is a reference clock is applied from the oscillator to the variable frequency division circuit 21 and a 4 KHz signal as a sound generation signal, which is generated by the variable frequency division circuit, is applied to the other input terminal of the AND circuit 27. The display circuit 23 generates the driving signals for displaying the tempo and the counter values on the display member 24 on the basis of the values outputted from the tempo setting register, the minute counter 15 and the hour counter 16 and displays them on the display member 24.

Next, the operation of the present device will be explained. This embodiment explains the operation of the metronome which generates the tempo sound for a predetermined time (timer set value) by way of example. First of all, T-F/F 35 is a flip-flop which controls timer subtraction. It makes the substraction operation when the Q output is at a level "1" and its operation is stopped when the Q output is at a level "0" as the logic "1" is inputted to R (reset) of the second counter 14 through the inverter 13. T-F/F 35 is also a flip-flop which controls the existence and absence of sound generation. It generates the sound (tempo sound) when the Q output is "1" and does not generate the sound when it is "0". The second, minute and hour counters 14, 15 and 16 are timer counters capable of up-down operations. The tempo setting register 20 stores the number of tempos set from outside such as tempo =120, for example. The variable frequency division circuit 21 divides the frequency of the reference clock $\phi$ by a predetermined number in accordance with the memory content of the tempo setting register 20. This is determined in accordance with the number of tempos.

FIG. 3 shows a time chart at each point in the circuit shown in FIG. 2. First of all, predetermined timer values are stored in the minute and hour counters 15 and 16 by operating the timer SET switch 32 (timing chart of signal A). At this time, T-F/F 35 is reset and the timer is stopped. Since one of the inputs of the AND circuit 41 becomes "1" and the other is signal, the timer value of the hour counter 16 is set by the minute counter 15 carry-out signal a. Here, each counter makes the UP operation. Next, the timer RUN switch 31 is turned ON (timing chart of the signal B). The Q output of T-F/F 35 is set to "1" by this switch and the signal I reachs "1". Each counter 14, 15, 16 is in the DOWN mode and the second counter 14 is counted down by the 1 Hz signal. In other words, the timer counter makes the substraction operation. The variable frequency division circuit 21 is only operative in accordance with the memory content of the tempo setting register 20 and so long as the Q output of T-F/F 36 for controlling the existence of sound generation is at the level "0", the sound generation device 25 does not operate.

Next, when the ON/OFF switch 34 is turned ON, the Q output of T-F/F 36 is set to "1" (timing chart of signals C and H). This signal sets one input of the AND circuit 42 to the level "1" and the sound generation device 25 is driven at the timing of the output of the one-shot multivibrator circuit 22 (signal G) in accordance with the output of the variable frequency division circuit 21. The frequency of the sound of this sound generation is 4 kHz. (Refer to the timing of the signals G and J.) When the set time of the counter lapses or in other words, when the count value of the timer counter repeats subtraction and reaches zero, a pulse is outputted to the output of the zero detection circuit 17 (timing of the signal D), the one-shot multivibrator circuit 18 operates and the time-up sound is generated through the OR circuit 26 (timing of the signals E, and J). The output of the one-shot multivibrator circuit 18 is connected to the other input terminal of each of the delay circuit 19 and the AND circuit 40 and therefore resets T-F/Fs 35 and 36 (timing of the signal F). Due to the operation of the delay circuit 19, T-F/F 36 is first reset and then T-F/F 35 is reset. Due to this operation, the subtraction operation of the timer stops and sound generation of the tempo sound stops, too. As a result, the tempo sound is generated for only the time set by the timer value. The above explains the metronome operation interlocked with the timer.

Next, the timer can be operated independently by keeping T-F/F 36 under the reset state. In other words, the tempo sound is not generated. However, since there is no problem as to the timer operation, the remaining time can be known during the performance of a musical piece. The time-up sound is generated only once when subtraction of the timer is complete.

Effect of the Device

In accordance with the present device, the timer factor of the management of the practice time can be added to the practice of music using a metronome and the present device is convenient for the practice by children. The management of the remaining time during the play becomes easy if the performance time of a musical piece is known in advance.

What is claimed is:

1. In an electronic metronome having a tempo setting register capable of setting an arbitrary tempo from outside, a variable frequency division circuit dividing the frequency of a reference clock by an arbitrary division frequency in accordance with the memory content of said tempo setting register, and display means:
   - timer setting means capable of setting an arbitrary timer value from outside;
   - a timer counter for storing a timer value in accordance with the output of said timer setting means;
   - timer start means for letting said timer counter make a subtraction;
   - timer zero value detection means for detecting that the subtraction value of said timer counter becomes zero;

sound generation means for generating a tempo sound in accordance with said tempo or a time-up sound in accordance with the output of said timer value zero detection mean; and a control circuit for stopping the sound generation of said tempo sound when said timer value zero detection means makes a zero detection of said timer counter.

2. An electronic metronome comprising: means for setting a desired tempo; means for generating a tempo signal corresponding in time to the desired tempo; means for setting a desired time period; means for generating a time-up signal corresponding in time to the end of the desired time period; means receptive of the tempo signal and the time-up signal for generating a tempo sound for each tempo signal and a time-up sound for the time-up signal; and control means for terminating the generation of the tempo sounds after the generation of the time-up sound.

3. The metronome according to claim 2, wherein the means for setting a desired tempo comprises a tempo setting register and the means for generating the tempo signal comprises a variable frequency division circuit for dividing the frequency of a reference clock signal by a value in the tempo setting register and a one-shot multivibrator for generating a tempo pulse for each divided clock signal.

4. The metronome according to claim 2, wherein the means for setting a desired time period comprises an up/down counter and means for up-counting the counter to a given count corresponding to the desired time period.

5. The metronome according to claim 2, wherein the means for generating the time-up signal comprises means for down-counting the counter to zero, means for detecting a zero count in the counter and a one-shot multivibrator for generating a time-up pulse when a zero count is detected.

6. The metronome according to claim 5, wherein the control means comprises a set/reset flip-flop, means for setting the flip-flop to initiate tempo sound generation and means responsive to the time-up pulse for resetting the flip-flop.

7. The metronome according to claim 4, further comprising display means for displaying the count in the up/down counter and the desired tempo.

* * * * *